United States Patent [19]

Frye

[11] Patent Number: 5,020,897
[45] Date of Patent: Jun. 4, 1991

[54] MIRRORED DEVICE FOR EYE DROP USERS

[76] Inventor: Richard D. Frye, 3324 Lakeside Cir., Parrish, Fla. 34219

[21] Appl. No.: 529,215

[22] Filed: May 25, 1990

[51] Int. Cl.⁵ ............................................. G02B 7/18
[52] U.S. Cl. ..................................... 350/638; 351/50
[58] Field of Search .......................... 350/638; 351/50

[56] References Cited

U.S. PATENT DOCUMENTS

| 574,877 | 1/1897 | Blomiley | 350/638 |
|---|---|---|---|
| 1,024,506 | 4/1912 | Graham | 350/638 |
| 2,502,224 | 1/1948 | Kozloff | 350/638 |
| 3,697,156 | 10/1972 | Hyvarinen | 350/638 |
| 4,804,261 | 2/1989 | Kirschen | 351/158 |

Primary Examiner—Bruce Y. Arnold
Assistant Examiner—J. P. Ryan
Attorney, Agent, or Firm—Charles J. Prescott

[57] ABSTRACT

A portable mirrored device for eyedrop users and contact lens wearers including a headband sized for supportively positioning around the user's head, a forwardly extending arm pivotally connected on either side of the headband, and a transverse mirror housing pivotally mounted between the other end of each extension arm. The protective mirror housing includes a mirrored rearwardly facing surface for viewing. By this arrangement, the user may conveniently position the mirrored surface so as to view his or her own eyes as contact lenses are positioned or eye medication is dispensed into the eyes.

6 Claims, 1 Drawing Sheet

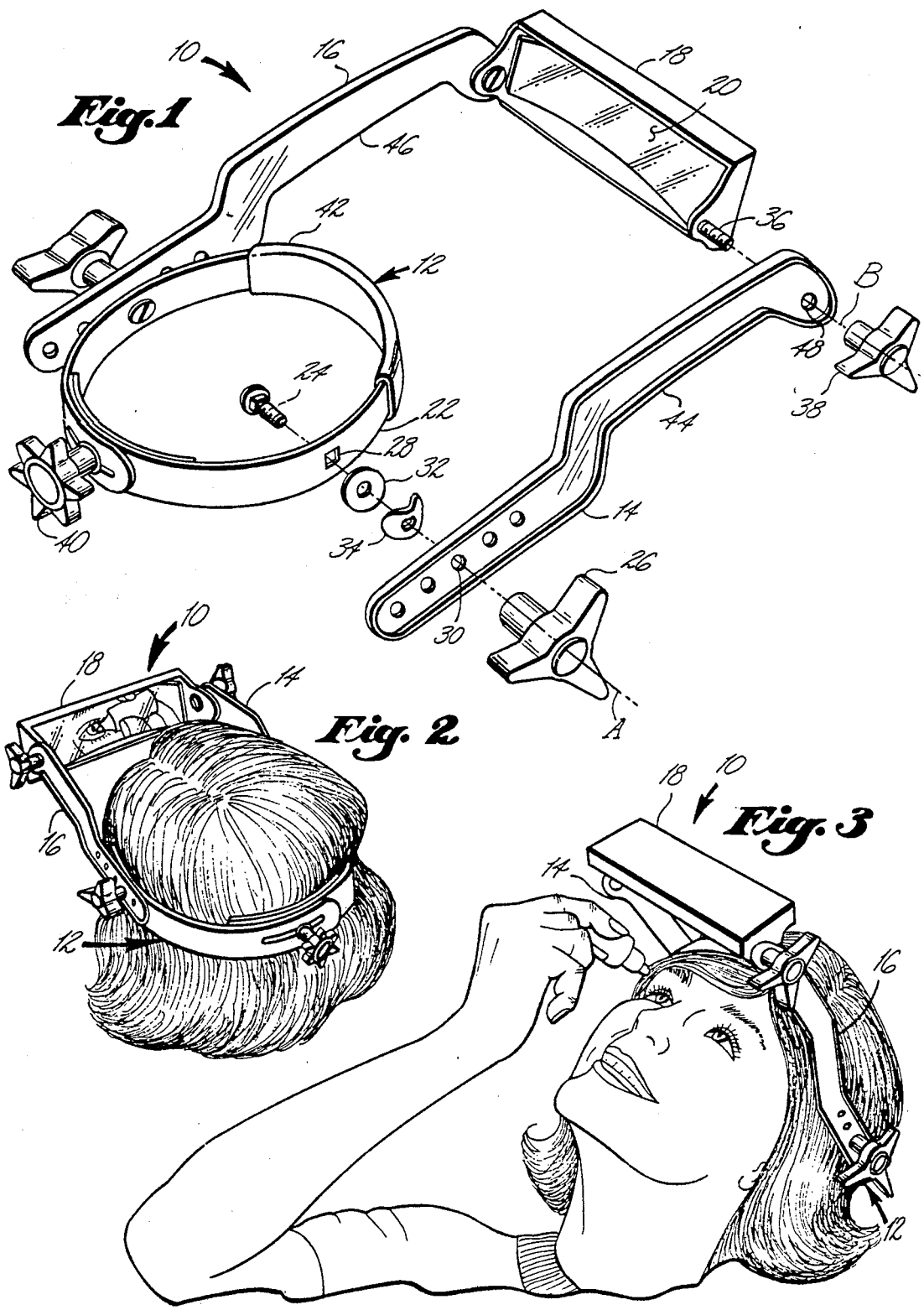

MIRRORED DEVICE FOR EYE DROP USERS

BACKGROUND OF THE INVENTION

The present invention relates generally to a portable mirrored device for personal use, and more particularly to a fully adjustable, portable mirrored device for assisting eyedrop users and contact lens wearers in the application thereof.

Those who wear contact lenses and those who routinely have to apply medication into the eyes may have a great deal of difficulty in accomplishing these tasks on a regular basis. Viewing ones own progress in a wall-mounted mirror is difficult at best because the mirror is typically positioned at some distance from the user. Should the user attempt to get close to the wall mounted mirror sufficiently to enhance the size of the reflected image, the mirror itself becomes an obstacle to further progress.

A portable adjustable mirror assembly is disclosed in U.S. Pat. No. 4,707,087 to Van Zandt which is directed to a torso mounted adjustable mirror which positions the mirror directly in front of the user. Another device particularly intended for assisting in hair styling and make-up applications is disclosed in U.S. Pat. No. 3,609,015 to Messinger which teaches a frame similar to a pair of eyeglasses having a forwardly adjustable positionable mirror slidably mounted on an elongated rod extending from the bridge of the eyeglass structure.

Applicant is also aware of an unpatented headband-type structure having adjustably positionable magnifying lenses placed in front of the user's eyes.

The present invention discloses a portable mirrored device specifically intended to aid eyedrop eye medication users and contact lens wearers having an adjustable headband and a pair of forwardly extending side arms or extension arms which pivotally support a transverse mirror housing therebetween. The rearward surface of the mirrored housing is reflective having a mirror contained therein which may be of the magnifying type for providing an enlarged image of the eye. The extension arms themselves are pivotally mounted about a transverse axis on the headband so that the user has a great deal of flexibility in positioning the mirrored surface for optimal viewing without interference from the device itself.

BRIEF SUMMARY OF THE INVENTION

This invention is directed to a portable mirrored device for eyedrop users and contact lens wearers including a headband sized to be supportively positioned around the user's head, a forwardly extending arm pivotally connected on either side of the headband, and a transverse mirror housing pivotally mounted between the other end of each extension arm. The protective mirror housing includes a mirrored rearwardly facing surface for viewing. By this arrangement, the user may conveniently position the mirrored surface so as to view his or her own eyes as contact lenses are positioned or eye medication is dispensed into the eyes.

It is therefore an object of this invention to provide a portable mirrored device to be worn about the head of the user to assist in the application of eye medication and contact lenses into the user's eye.

It is another object to provide the above invention with a broad range of adjustability to accommodate all user's head sizes and minimum focal distances.

It is yet another object to provide the above invention with a maximum of hand clearance with respect to the device during use.

In accordance with these and other objects which will become apparent hereinafter, the instant invention will now be described with reference to the accompanying drawings.

BRIEF DESCRIPTION OF THE DRAWINGS

FIG. 1 is a partially exploded perspective view of the invention.

FIG. 2 is a rear perspective view of the invention in use.

FIG. 3 is a frontal perspective view of the invention in use.

DETAILED DESCRIPTION OF THE INVENTION

Referring now to the drawings, the invention is shown generally at numeral 10. This device 10 includes an adjustable, molded plastic headband 12, a pair of elongated spaced apart molded plastic extension arms 14 and 16, and a transverse molded plastic mirror housing 18 having a protected mirrored surface 20.

The headband 12 is pivotally connected to each extension arm 14 and 16 by threaded fastener 24 passing through aperture 28 (typical) on either side of the headband 12 and then through one aperture 30 (typical) of an array in each extension arm 14 and 16 provided for fore-and-aft adjustability of the mirror housing 18. Hand nut 26 then tightens each of these pivotal connections, washer 32 and lock washer 34 provided for enhanced adjustability and locking of the selected angular position between the headband 12 and each extension arm 14 and 16. Pivoting between the headband 12 and each extension arm 14 and 16 is along a transverse axis A which generally passes through the central portion of headband 12 as shown.

The mirror housing 18 is pivotally connected on threaded fasteners 36 passing through an aperture shown typically at 48 in the forward end of each extension arm 14 and 16. Again, a hand nut 38 is provided to tighten and secure the particular angular orientation of the mirror housing 18 with respect to the extension arms 14 and 16. Pivoting of the mirror housing 18 with respect to extension arms 14 and 16 is along transverse axis B which is forwardly spaced from, and generally parallel to, axis A.

The mirror housing 18 includes a plastic mirror 20 which may be flat, or preferably concave to provide a magnified or enlarged view of the user's eye area. The mirror 20 is protectively seated within the sidewalls integrally formed with the molded mirror housing 18 as shown.

A length of resilient covering material 42 is provided for an additional level of comfort of the headband 12 against the skin of the forehead of the user. An adjusting knob 40 is also provided so that the overlapping ends of headband 12 may be secured in any desired position to easily vary the overall circumference of the headband 12.

As shown in FIG. 2, the user may easily view his or her eye as eye medication is placed therein. As seen in FIG. 3, because the headband 12 fits adjustably snug around the user's head, the user may conveniently tilt the head back for more convenient eyedrop placement.

The extension arms 14 and 16 also include an elevated mid portion 44 and 46, respectively, which are provided to insure that the extension arm 14 and 16 do not interfere with the user's free and clear hand access to the eyes during the application of medication or the insertion or removal of contact lenses.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable mirrored device for eyedrop and contact lens users comprising:
    a headband formed to snugly fit around the user's head;
    an elongated extension arm pivotally connected at one end to either side of, and forwardly extending from, said headband about a first transverse axis;
    pivotal connection means, connecting said headband to each said extension arm, for permitting at least 90° of pivotal motion through a central position wherein said extension arms forwardly extend from said headband;
    a transverse mirror housing pivotally connected at each end between the other ends of each said extension arm about a second transverse axis which is generally parallel to and forwardly spaced from said first axis;
    said mirror housing having a mirrored rearwardly facing surface;
    each said extension arm, said mirror housing, and said pivotal connection therebetween, and said pivotal connection means between said headband and each said extension arm cooperatively structured and arranged to allow the user to view his or her eyes on said mirrored surface as eye medication and contact lenses are placed into the eyes.

2. A portable mirrored device as set forth in claim 1, wherein:
    said headband is adjustable in circumference to accommodate a wide variety of users.

3. A portable mirrored device as set forth in claim 2, wherein:
    each said extension arm is adjustably positionable on said headband to position said mirror housing forwardly or rearwardly to accommodate the user's particular eyesight.

4. A portable mirrored device as set forth in claim 3, wherein:
    all said pivotal connections are lockable by a mechanical thumb screw engaging onto a threaded fastener at each said pivotal connection.

5. A portable mirrored device as set forth in claim 4, wherein: said mirror surface is concave, for producing enlarged images.

6. A portable mirrored device as set forth in claim 1, wherein: each said extension arm includes an elevated mid portion providing additional hand clearance therebelow during use.

* * * * *